United States Patent Office 3,606,599
Patented Sept. 20, 1971

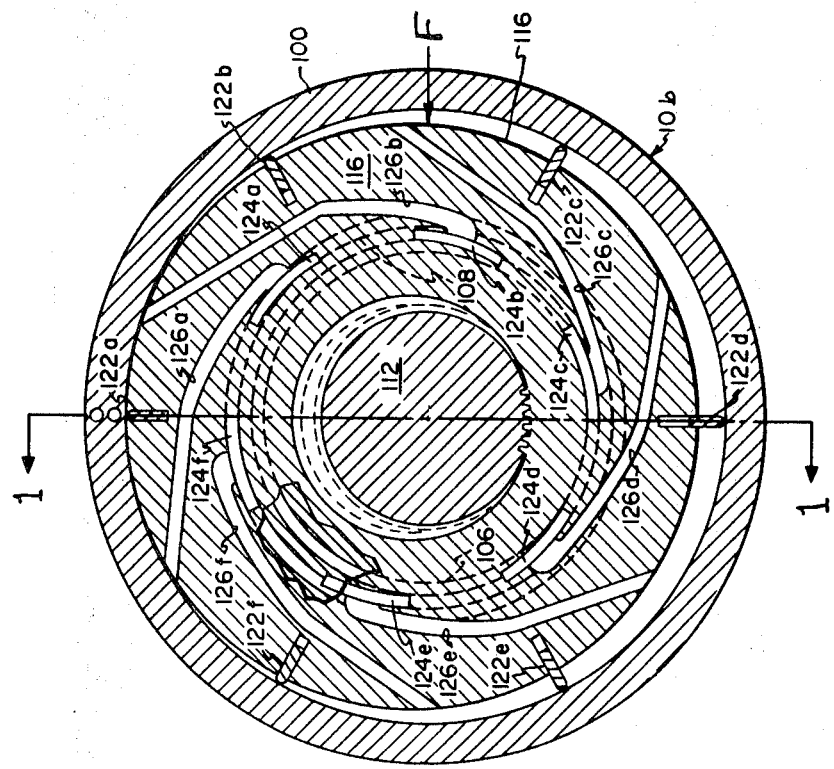
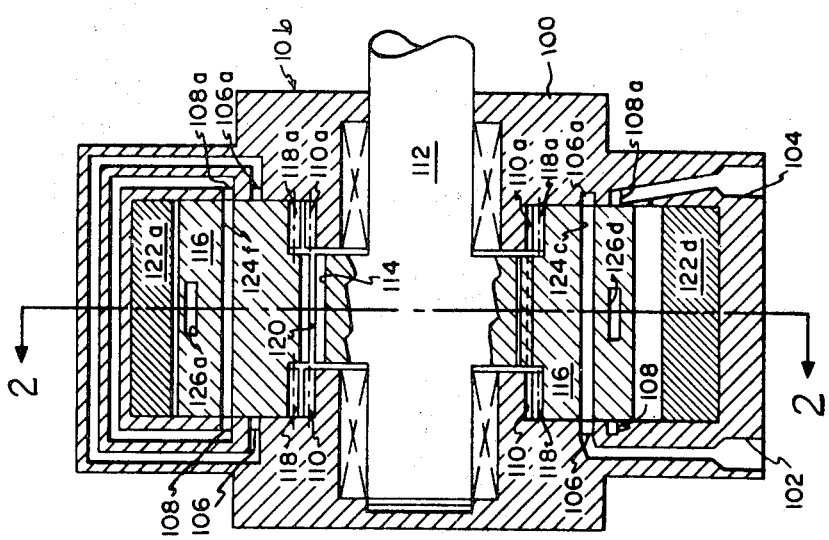
INVENTORS
GEORGE I. BOYADJIEFF
KENNETH W. VERGE
BY
*Olsen and Stephenson*
ATTORNEYS

3,606,599
FLUID POWERED ACTUATOR HAVING FLUID DISPLACEMENT CHAMBERS FORMED BETWEEN HOUSING AND RING GEAR
Kenneth W. Verge, Farmington, Mich., and George I. Boyadjieff, Woodland Hills, Calif., assignors to The Bendix Corporation
Original application Oct. 30, 1967, Ser. No. 678,951, now Patent No. 3,516,765, dated June 23, 1970. Divided and this application Apr. 10, 1970, Ser. No. 27,276
Int. Cl. F01c *1/02, 1/42*
U.S. Cl. 418—61                4 Claims

ABSTRACT OF THE DISCLOSURE

A fluid actuated integrated motor-transmission unit in which an output gear and a coaxial stationary gear coact with a driven eccentric ring gear that is free floating and meshes therewith to provide for a direct drive of the output gear by driving the ring gear so that the axis thereof orbits about the output gear axis. The ring gear is driven by sequentially pressurizing and exhausting a series of fluid displacement chambers formed between the floating ring gear and an enclosing housing.

CROSS REFERENCE TO RELATED APPLICATION

This application is a division of copending application Ser. No. 678,951 filed Oct. 30, 1967, now Pat. No. 3,516,765.

The actuator of this invention is an integrated motor-transmission unit which is driven by fluid under pressure and in which a desired transmission ratio is an integral part of the structure. The unit consists of a housing, stationary gear means mounted on the housing, an output gear mounted in the housing in a coaxial relation with the stationary gear and a floating ring gear having first teeth which mesh with the stationary gear and second teeth drivingly engaged with the output gear. The ring gear is disposed adjacent the housing and a plurality of vanes are slidably mounted on the ring gear so that they engage the housing and cooperate therewith to form a plurality of fluid displacement chambers around the ring gear. The ring gear is driven by a rotating force which moves in a path extending in one direction around the ring gear so as to move the ring gear in an orbital path relative to the axis of the output and stationary gears. This actuating force is generated by supplying fluid to successive ones of the displacement chambers concurrently with exhausting fluid from other ones of the displacement chambers. This construction thus utilizes movement of the ring gear to effect movement of the motor input force and the numbers of teeth on the gears can be varied to provide design flexibility from the standpoint of size and transmission ratio. The vanes which form the fluid displacement chambers oscillate over short distances as the ring gear is moved so that there are no high rubbing velocities as in a conventional vane motor. The actuator has a supply passage for fluid and a discharge passage for fluid. To effect reversed rotation of the actuator, it is only necessary to reverse the functions of these passages, such as by use of an external valve.

It is an object of this invention, therefore, to provide an improved actuator of the above-described type.

Further objects, features and advantages of this invention will become apparent from a consideration of the following description, the appended claims, and the accompanying drawing in which:

FIG. 1 is a sectional view of the actuator of this invention as seen from substantially the line 1—1 in FIG. 2; and FIG. 2 is another sectional view of the actuator of this invention as seen from substantially the line 2—2 in FIG. 1.

With reference to the drawing, the actuator of this invention, indicated generally at 10b, is illustrated as consisting of an annular housing 100 formed with a fluid inlet passage 102 which is connected to the output side of a suitable fluid pressure source, such as a pump (not shown) and an exhaust passage 104 which is connected to the inlet side of the fluid pressure source. A pair of annular passages or ports 106 and 106a are formed in the housing 100 so that they communicate with the inlet passage 102. A pair of annular passages or ports 108 and 108a are also formed in the housing 100 at positions concentric with the passages 106 and 106a and at positions connected to the exhaust passage 104.

Stationary gears 110 and 110a are formed integral with the housing 100 and have identical aligned external gear teeth which may number one hundred. Output shaft 112 is mounted for rotation in housing 100 and forms an output gear 114 having external teeth which may number ninety five.

A floating ring gear 116 is mounted between an internal circumference of housing 100 and output shaft 112 and experiences epicyclic motion relative to housing 100 and shaft 112. The ring gear 116 has three sets of internal teeth 118, 118a and 120 which mesh respectively with the teeth of external gears 110 and 110a and 114. The number of gear teeth in each of internal ring gears 118, 118a may number one hundred ten. The number of teeth 120 may number one hundred five.

Six vanes 122a–f, inclusive, are reciprocally mounted in slots in the ring gear 116 and are spring urged against an internal circumference of housing 100 so as to divide the space around ring gear 116 into six fluid displacement chambers. Six ports 124a–f are formed through ring gear 116 at positions equally spaced about a common circumference. Six passages 126a–f are formed in ring gear 116 and connect respectively ports 124a–f to the outer circumference of ring gear 116 and are spaced so that one port is connected to each fluid chamber between vanes 122a–f.

Ports 124a–f move in an epicyclic motion with ring gear 116 and as a result some of the ports are at any given time in registry with input passages 106, 106a and others are in registry with discharge passages 108, 108a. In the illustrated embodiment 10b, the ports are arranged so that at any one time one half of the fluid compartments are pressurized and the other half of the fluid compartments are exhausted. This causes a movement of gear 116 which changes a pressure connection of one port to an exhaust connection and changes an exhaust connection from another port to a pressure connection which results in further movement of gear 116 and so forth resulting in a self-commutated epicyclic motion and rotation of force F. Since ring gear 116 is floating, it enjoys the advantages of minimum separation force for those reasons explained in the aforementioned parent application.

In the operation of the actuator 10b, one or more of the ports 124a–f is always in registry with a portion of the annular pressure ports 106, 106a on one side of the ring gear 116 and one or more of the ports 124a–f on the diametrically opposite side of the ring gear 116 is always in registry with a portion of the annular discharge ports 108, 108a. As a result, the force F is continually being applied to the ring gear 116 so as to move it in an epicyclic path about the output shaft 112. In the illustrated form of the actuator 10b, the ports 124b, c, and d register with the pressure ports 106, 106a so that the displacement chambers extending from the vane 122a in a clockwise direction to the vane 122d are supplied with pressure fluid. The other three displacement chambers communicate with the discharge ports 108, 108a so that the result is a force F directed as shown in FIG. 2 and located midway between the vanes 122a and 122d. It should be noted that the inlet and outlet ends of each of the passages 126a-f are spaced about ninety degrees apart on the circumference of ring gear 116. This provides for the force F being spaced about ninety degrees from the points of engagement between the ring gear with the output and stationary gears.

The force F shown in FIG. 2 will move the ring gear 116 to a new position in which different ones of the displacement chambers will be pressurized and exhausted so that the force F will be rotated in one direction about the output shaft 112. With the actuator 10b operating on air supplied to the inlet passage 102 at about 10 p.s.i.g., 70 in. lbs. of torque will be produced at the output shaft 112 running at 5 r.p.m. output speed. In the illustrated embodiment of the invention the transmission ratio is about 98:1.

The actuator 10b is self-commutating, by which is meant the epicyclic motion of the ring gear 116 is utilized to produce the desired rotation of the force F. The actuator 10b includes three principal components, namely, an output gear mounted for axial rotation, a stationary gear mounted in a co-axial relation with the output gear, and an eccentric floating ring gear relatively arranged so that rotational movement is obtained directly in response to fluid actuation of the ring gear and a desired transmission ratio can be obtained by adjusting the relative numbers of teeth on the gear components, all of which are formed of metal or an equivalent rigid material. In the actuator 10b stationary fluid passages 102 and 104 are provided which terminate in pressure and discharge ports for the displacement chambers. The ports are disposed in a circular formation about the output gear axis so that the functions of the ports can readily be reversed to thereby achieve reversed rotation of the output shaft. Self-commutation is achieved by the cooperation of these ports with the inlets for the displacement chambers which are disposed so that they sequentially register with the pressure and discharge ports on orbital movement of the ring gear, which is sometimes referred to as the orbital member.

We claim:
1. An actuator comprising:
a housing,
a stationary gear on said housing,
a rotatably mounted output gear,
said gears being arranged in a concentric relation,
floating ring gear means having first teeth, at least one of said ring gear means first teeth being drivingly engaged with said stationary gear,
said ring gear means having second teeth, at least one of said ring gear means second teeth being drivingly engaged with said output gear,
said ring gear means having an axis arranged eccentric with respect to the axis of said stationary and output gears and being mounted for orbiting movement in which the axis thereof moves about said stationary and output gear axis,
means for applying a moving force to said ring gear means moving in a path extending in one direction about said gear means so as to produce said orbiting movement to thereby provide for rotation of said output gear,
said last-mentioned means comprising means in said housing forming a plurality of fluid displacement chambers extending about said stationary and output gear axis, and
means for supplying fluid to successive ones of said chambers so as to develop said force,
wherein said housing extends about and is disposed adjacent said ring gear means, and wherein said means forming a plurality of fluid displacement chambers includes said housing and said ring gear means and a plurality of vanes which are slidably mounted thereon and extend therebetween.

2. An actuator according to claim 1 wherein said means for supplying fluid to said chambers includes fluid inlet passage means in said housing terminating in an annular pressure port, said ring gear means having a plurality of passages formed therein, each of which communicates at one end with one of said chambers, the opposite ends of said passages being positioned for successive registry with said pressure port in response to said orbiting movement of said ring gear means.

3. An actuator according to claim 2 wherein the ends of each of said passages in said ring gear means are angularly spaced apart in a direction circumferentially thereof.

4. An actuator according to claim 2 further including fluid discharge passage means in said housing terminating in an annular discharge port for said chambers disposed adjacent said pressure port and registerable with said opposite ends of said passages, said discharge port being located relative to said passages so that when one of said chambers communicates with said pressure port a diametrically opposite chamber communicates with said discharge port.

References Cited
UNITED STATES PATENTS

| | | | |
|---|---|---|---|
| 2,423,507 | 7/1947 | Lawton | 418—61 |
| 2,695,597 | 11/1954 | Griffiths | 418—61X |
| 2,713,828 | 7/1955 | Huber | 418—61 |
| 3,106,163 | 10/1963 | Mosbacher | 418—61 |
| 3,213,714 | 10/1965 | Hejj et al. | 418—61X |
| 3,226,013 | 12/1965 | Toyoda et al. | 418—61 |
| 3,339,460 | 9/1967 | Birdwell | 91—491 |
| 3,465,729 | 9/1969 | Jones | 418—61X |
| 3,516,765 | 6/1970 | Boyadjieff et al. | 418—61 |

CARLTON R. CROYLE, Primary Examiner

W. J. GOODLIN, Assistant Examiner